Feb. 14, 1928.
H. K. GILBERT
TURF CUTTER
Filed Sept. 7, 1926
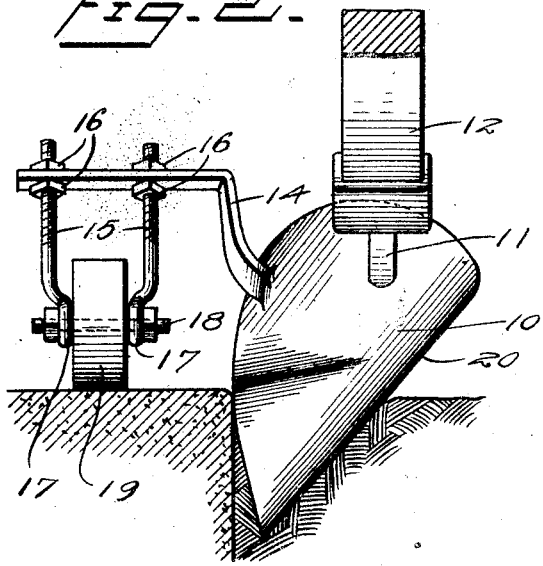
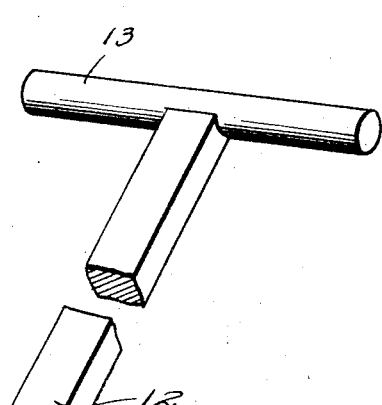
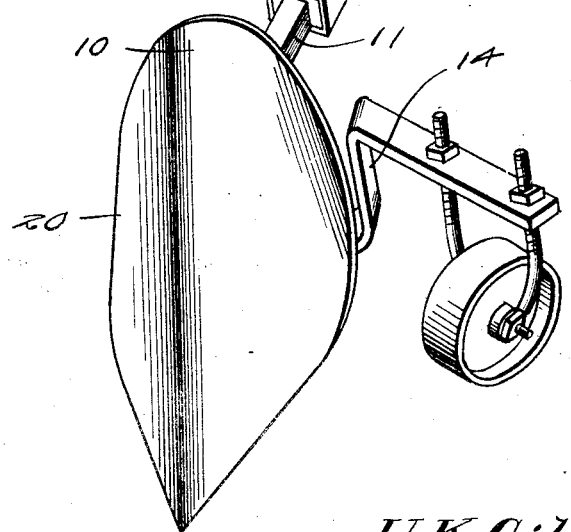
Inventor
H. K. Gilbert Patented Feb. 14, 1928.

1,658,892

UNITED STATES PATENT OFFICE.

HAROLD K. GILBERT, OF GARNER, IOWA.

TURF CUTTER.

Application filed September 7, 1926. Serial No. 134,039.

This invention relates to new and useful improvements in garden tools, and particularly to lawn trimmers.

One object of the invention is to provide a device of this character which is simple in construction, and by means of which the grass, and accompanying portion of soil, may be easily and neatly trimmed from the edges of side-walks, driveways, and the like.

Another object is to provide a device of this character which will remove the sod from the edges of walks, and the like, whereby to leave comparatively large grooves or trenches.

A further object is to provide a device of this character which is adjustable to permit the trench to be dug to different depths.

Other objects and advantages will be apparent from the following description when taken in connection with the accompanying drawing.

In the drawing:

Figure 1 is a perspective view of the tool.

Figure 2 is a rear elevation of the tool in the act of cutting the trench, a portion of the walk and lawn being shown in section.

Referring particularly to the accompanying drawing, 10 represents a plow blade which is provided with a shank 11 connected to one end of the handle bar 12, said handle bar having a transverse head 13, on its other end, to be grasped by the operator, for the purpose of pushing the blade through the grass and soil at the side of a walk, driveway, or the like. The blade is curved in such a way that the grass and soil dug up thereby will be thrown off toward one side of the device. Connected to one side of the blade, and offset outwardly and upwardly away from said side, is an arm 14. Disposed vertically through the outer end of the arm are the two stems 15, each being secured to the bar or arm 14 by means of the clamping nuts 16. The lower end of each of the stems 15 is provided with an eye 17 which receives an end of a shaft 18, and rotatably supported on this shaft, between the stems, is the gage wheel 19, said wheel being adapted to run on the edge portion of the cement walk, or driveway, whereby to gage the depth at which the blade 10 cuts through the grass and soil at the side of the walk or driveway. The edge of the blade, remote from the gage wheel, is inclined upwardly from its opposite ends to form the elevation 20, such edge being sharpened for the purpose of properly cutting grass and soil, as the device is pushed forwardly. The grass and soil, cut by said edge of the blade, is rolled off toward one side thereof, by reason of the particular transverse curve of the blade. By means of the nuts 16 the stems 15 may be adjusted upwardly or downwardly, whereby to raise or lower the gage wheel, and thereby regulate the depth of the trench.

What is claimed is:

A lawn edge trimmer and trench digger comprising a digging and cutting plow blade having an integral stem extending upwardly and rearwardly from the upper rear portion thereof and an arm formed integrally with the blade and extending upwardly and laterally from one side thereof, the outer end of the stem being formed with a socket receiving a handle stem therein, the lateral arm having a series of openings, a pair of threaded stems disposed through the said openings and having clamping means thereon above and below the arm, a transverse shaft supported in the lower ends of the pair of stems, and a wheel mounted on the shaft between the stems.

In testimony whereof, I affix my signature.

HAROLD K. GILBERT.